US006193199B1

(12) United States Patent
Karam, II

(10) Patent No.: US 6,193,199 B1
(45) Date of Patent: Feb. 27, 2001

(54) SAMPLE STAGE INCLUDING A SLIDER ASSEMBLY

(75) Inventor: Raymond M. Karam, II, Santa Barbara, CA (US)

(73) Assignee: NanoMotion, Inc., Goleta, CA (US)

( * ) Notice: Subject to any disclaimer, the term of this patent is extended or adjusted under 35 U.S.C. 154(b) by 0 days.

(21) Appl. No.: 09/115,949

(22) Filed: Jul. 15, 1998

(51) Int. Cl.[7] .................................................. E04G 3/00
(52) U.S. Cl. ................................ 248/276.1; 248/298.1; 248/646; 248/661; 74/89.15; 384/907
(58) Field of Search .................................. 384/42, 907.1, 384/913; 248/646, 657, 660, 661, 298.1; 74/89.15

(56) References Cited

U.S. PATENT DOCUMENTS

| | | | |
|---|---|---|---|
| 2,452,804 | * 11/1948 | Sulprizio | 384/42 |
| 2,675,276 | * 4/1954 | Daugherty | 384/42 |
| 2,719,761 | * 10/1955 | Bonnafe | 384/42 |
| 3,711,171 | * 1/1973 | Orkin et al. | 384/907.1 X |
| 4,409,860 | * 10/1983 | Moriyama et al. | 248/657 X |
| 4,512,616 | * 4/1985 | Suzuki et al. | 384/42 |
| 4,944,606 | * 7/1990 | Lindsey et al. | 384/42 |
| 5,306,919 | 4/1994 | Elings et al. . | |
| 5,359,479 | 10/1994 | Karam, II . | |
| 5,381,288 | 1/1995 | Karam, II . | |
| 5,408,372 | 4/1995 | Karam, II . | |
| 5,439,293 | * 8/1995 | Mizuno et al. | 384/42 X |
| 5,599,109 | * 2/1997 | Negwer | 384/907.1 X |
| 5,738,446 | * 4/1998 | Ghosh et al. | 384/913 X |

OTHER PUBLICATIONS

Takacs, Peter Z., et al., "Surface Topography Measurements Over the 1 Meter to 10 Micrometer Spatial Period Bandwidth." *SPIE 33rd Annual International Technical Symposium . . .*, 1989, BNL–42519.
Irick, S. C., et al. "Using a Straightness Reference in Obtaining More Accurate Surface Profiles From a Long Trace Profiler." *Rev. Sci. Instrum. 63* (1), 1992, pp. 1436–1438.
Takacs, Peter Z., et al. "Long Trace Profile Measurements on Cylindrical Aspheres." *Proc. SPIE* 966, 1988, BNL–40955, pp. 354–364.
Takacs, Peter Z., and Cynthia J. Bresloff. "Significant Improvements in Long Trace Profiler Measurement Performance." *Optics for High–Brightness Synchrotron Radiation Beamlines II, SPIE*, vol. 2856, 1996, pp. 236–245.
Takacs, Peter Z., et al. "A Step–Height Standard for Surface Profiler Calibration." *Quality and Reliability for Optical Systems*, SPIE, vol. 1993, 1993, pp. 65–74.

* cited by examiner

*Primary Examiner*—Ramon O. Ramirez
*Assistant Examiner*—Walter Landry
(74) *Attorney, Agent, or Firm*—Nilles & Nilles, S.C.

(57) ABSTRACT

A sample stage of a precision sample positioning system includes a sample plate supported above a base plate on a plurality of slider assemblies. Each slider assembly includes a base slider secured to a surface of the base plate and a stage slider secured to the sample plate. Each slider is made from a common material. The common material possesses the characteristic of not having a yield point, and having a sufficiently high strength so as to permit sliding without surface degradation.

35 Claims, 9 Drawing Sheets

SAMPLE STAGE INCLUDING A SLIDER ASSEMBLY

BACKGROUND OF THE INVENTION

1. Field of the Invention

This invention is in the field of precision positioning and translating mechanisms, and more particularly relates to a positioning mechanism, often referred to as a sample stage, having superior translational flatness, speed and accuracy.

2. Description of the Related Art

As critical dimensions become increasingly smaller in devices such as semiconductors and magnetic data storage devices, the positioning and translating of both the manufactured items and process equipment components becomes subject to much more stringent tolerances. Existing techniques for positioning and translating are becoming inadequate. For example, stylus profilometers are commonly used to make height measurements on integrated circuit structures over lateral distances up to several centimeters. With the advent of the Chemical Mechanical Planarization processor multi-layer circuits, these heights need to be known to a few nanometers over lateral distances from a few millimeters up to a few centimeters. The sample stages used in existing profilometers to translate the sample relative to the stylus do not have the necessary flatness to make fine height measurements over such long distances. That is, the sample stage itself introduces significant measurement error. Atomic Force Microscopes (AFMs) and optical profilometers, such as interference microscopes, also have superior height resolution compared to the performance of available sample stages, such that these instruments are usually employed with the sample stationary during measurements. Having to maintain the sample stationary severely limits these devices from being employed for profilometer applications despite their superior resolution and less destructive sample interaction. Process equipment, such as mask steppers or electron beam lithography systems, where the depth of focus of the light or beam is very short, also are becoming limited by the performance of available positioning systems. Precision machine tools such as lens grinder/polishers and diamond turning lathes also could benefit from positioning and translating capability that exceeds current technology.

Existing positioning systems for high precision applications generally fall into three categories. The first category is translation stages where the specimen holder rides on precision roller bearings. The stage may be actuated by a variety of mechanisms, such as motors driving a lead screw. With sufficiently fine control of the drive mechanism, and feedback on the actual stage position, such stages can achieve positioning accuracy well below one micrometer. However, during translation the vertical motion of the specimen is many tens of nanometers or more, and is furthermore not strictly periodic. Therefore, these stages are not useful while moving for applications demanding precise control of the height, and thus, these stages are typically employed with the process or measurement disengaged while the stage is moving, and then engaged only when the stage has reached the desired location and stopped. These stages have the advantage that, when stopped, they can be made to vibrate minimally. This attribute has made roller bearing stages attractive sample positioners for very high-resolution instruments, like AFMs, where the sample must be stationary to a fraction of a nanometer while the measurement is being taken.

The second category of precision positioners is a translation stage that consists of two hard, flat surfaces separated by a lubricant of some kind. In a typical arrangement a bottom plate is fixed to the system structure. A top surface of the bottom plate is machined very flat as is a bottom surface of a top plate. A top plate rides on the bottom plate with a viscous lubricant layer in between. An actuator, which may be a motor/lead screw, a piezo driven flexure or some other finely controlled linear motion element, moves the top plate. The sample or work piece is mounted to the top plate, and the process or measurement device is mounted opposite the sample. The lubricant is required because when traditional bearing surfaces are made sufficiently flat to provide very smooth translation, the surfaces will bind. This binding will cause vertical noise, and eventually, will cause smearing or spalling of the surfaces thereby reducing their smoothness and further introducing measurement error.

The arrangement is most commonly realized in air bearing stages, where the lubricant is pressurized air that is sufficient to float the top plate. Air bearing stages outperform mechanical bearing stages in several areas. Because of their low friction, they can be translated extremely quickly. Because there are no discrete elements affecting the stage position, air bearing stages may be positioned along the axis of travel very precisely, down to a few nanometers of precision with the use of position sensors such as laser interferometers. The motion during translation is much flatter than a roller bearing stage. Air bearing stages are routinely used in many high-speed production applications such as wafer steppers. However, even air bearing stages have too much vertical movement and translation induced vertical motion for applications such as AFMs or profilometers. The pressurized air generation (pumping) creates at least several nanometers of noise and vertical motion, which is generally unacceptable for high-resolution metrology measurements.

A more viscous lubricant could be used that would not require pumping, and thereby would avoid the associated vibration. However this approach is not common. When starting translation, the lubricant adjacent the stationary plate is at zero velocity while the lubricant adjacent the moving plate is at or near the velocity of the plate. Until equilibrium is reached, the moving plate tends to float up at first, then settle, and then repeat the cycle when the moving plate comes to a stop. Therefore, this type of stage is not common because it does not have desirable translation characteristics and is slower. Vibration is less, but in general, air bearing stages are more useful. The same effect can exist in some types of air bearing stages, but equilibrium is reached quickly enough that the effect is not significant. In addition, oils and other viscous lubricants are not usually acceptable in cleanrooms where most high precision manufacturing is done. Lubricated sliders, as well as air bearing stages, also are incompatible with vacuum applications.

Some limited hard surface to hard surface sliding applications without lubricants have been tried using dissimilar materials. For example, in aerospace applications, such as jet turbines, a graphitic material is used as a coating on the turbine blades rotor seal. The ceramic coating is used to protect the turbine blade in the extremely harsh jet turbine engine environment. Ceramic materials have been used as a passivation or coating in semiconductor and food processing applications and as the rolling element in roller bearing applications, which also, of course, is not a sliding application.

The third category of precision positioners is a translation stage using a soft material sliding on a hard material. The most common application of this technology is in the translation stage found in almost all stylus profilometers. A smooth, flat glass optical plate is attached to the system structure. The moving plate has polytetrafluoroethylene (Teflon®) pads, which slide over the glass plate. The moving plate is moved by one of several mechanisms. The sample is attached to the moving plate, and the stylus pivots up and down in response to variations in sample topography. Although this type of translation mechanism has the lowest noise, the flattest type commonly available for translating specimens for distances from 100 microns to a few hundred millimeters (mm) still has several disadvantages. For example, the Teflon® sticks to the glass at the start of translation, so the translation must be started well ahead of the measurement or process to smooth the motion by the time the position of interest is reached. Additionally, the translation speed is limited, and the Teflon® wears to a condition where translation can only occur in one direction without significant stick/slip behavior.

SUMMARY OF THE INVENTION

A sample stage of a precision sample positioning system includes a sample plate supported above a base plate on a plurality of slider assemblies. Each slider assembly includes a base slider secured to a surface of the base plate and a stage slider secured to the sample plate. Each slider is made from a common material and is formed to include an extremely flat sliding surface. The common material possesses the characteristic of lacking a yield point and having a sufficiently high strength so as to permit sliding of one slider with respect to the other slider with little noise and without surface degradation.

In an alternate embodiment, a sample stage of a precision sample positioning system includes a sample plate and a sample stage driver. The sample plate is supported on a base plate by a plurality of slider assemblies. The sample stage driver is secured to a support structure portion of the precision sample positioning system and is arranged to deliver a translation force for translating the sample stage relative to the base plate. The sample stage drive includes a translation stage directly coupled to a drive mechanism and coupled by a flexure element to the sample plate. The flexure element is arranged such that a translation force is transmitted "in-plane" to the sample plate while minimizing "out-of-plane" motions. The sample stage driver may also be arranged for providing translation motion in two-dimensions.

In yet another embodiment, a sample stage of a precision sample positioning system includes a sample plate, a sample stage driver, and a translation controller. The sample plate is supported on a base plate by a plurality of slider assemblies. The sample stage driver is secured to a support structure portion of the precision sample positioning system and is arranged to deliver a translation force for translating the sample plate relative to the base plate. The controller is arranged for providing very precise translation velocity control, which is important for eliminating translation "jitter" that may introduce measurement noise.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

The present invention provides a precision sample positioning system including a sample stage. The sample stage is translated relative to a base upon slider assemblies arranged for sliding engagement without a lubricant. The slider assemblies include two hard, tough sliders constructed from a similar material. The slider assemblies typically operate without lubricant at sliding speeds to minimize viscous shear and to maintain surface contact. In spite of being formed from a common material and with an exceptionally smooth surface to provide translation without out-of-plane motion, the sliders constructed in accordance with the present invention unexpectedly do not bind to each other, which would hinder smooth, predictable motion.

2. The Precision Sample Positioning System

A. The Sample Stage Drive Mechanism

Figure 1:
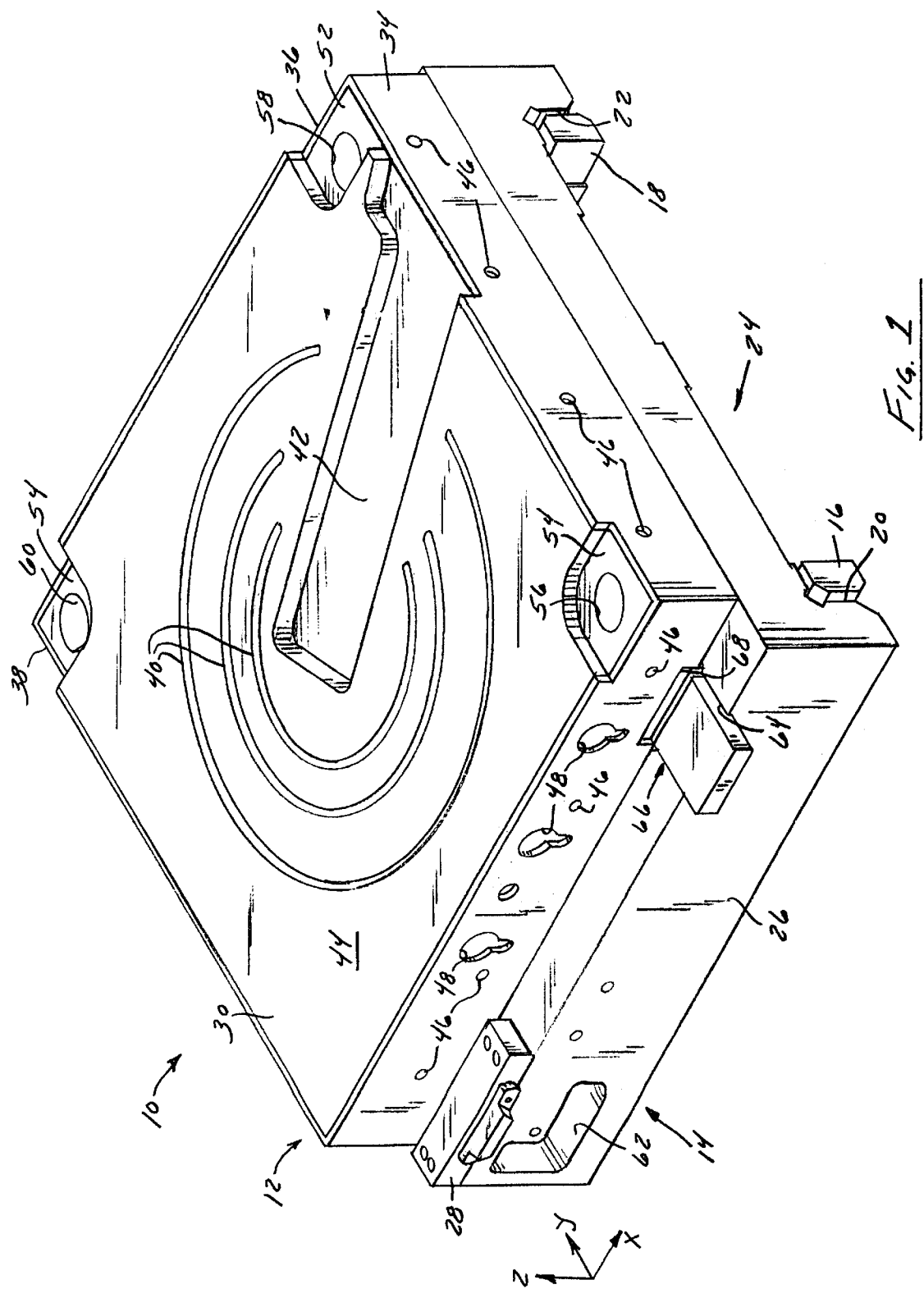
FIG. 1 is a top, perspective view of a precision sample positioning system including a sample stage in accordance with a preferred embodiment of the present invention.

Referring now to the drawings, and particularly to FIG. 1, a precision sample positioning system 10 includes a sample stage 12 mounted for translation relative to a positioning stage 14 secured to a support structure (not shown). Positioning stage 14 includes a base 26 preferably formed from metal such as aluminum. Positioning stage 14 is further arranged for linear translation relative to the support structure upon a first bearing assembly 16 and a second bearing assembly 18 secured to the support structure and arranged to engage a bearing surface 20 and a bearing surface 22, respectively, formed in a bottom portion 24 of base 26. First bearing assembly 16 and second bearing assembly 18 are preferably precision, linear roller bearing assemblies. Bearing surface 20 and bearing surface 22 are preferably machined into base 26 and ground to a precision flatness. Positioning stage 14 provides gross translation in the as indicated "x" direction, and is preferably adapted with a suitable drive mechanism as is known in the art for providing such linear motion. Positioning stage 14 further includes a wiring connector assembly 28 for suitable connecting system 10 to a power supply and controller (not shown). Base 26 further includes wiring aperture 62 for providing wiring access to the sample stage drive mechanism housed therein and a recess 64 into which a linear encoder assembly 66 is secured.

Sample stage 12 includes a sample plate 30 secured within side plates 32–38. Sample plate 30 is adapted as a vacuum chuck as is known in the art, and in this regard includes a plurality of ridged surfaces 40 and a recess 42 formed in a top surface 44 of sample plate 30. A sample is placed onto ridged surfaces 40 and a vacuum is drawn below the sample for holding it firmly to sample plate 30 on ridges 40. Side plates 32–38 are formed with apertures 46 for receiving threaded fasteners (not shown) for securing side plates 32–38 to sample plate 30. Side plate 32 also includes "keyhole" shaped apertures 48 for vacuum switches which control vacuum to sample plate 30. Sample plate 30 is further formed with recessed corner portions 50–54, including through apertures 56–60, respectively, for holding various calibration reference standards. A recess 68 is also provided in side plate 32 and a corresponding recess (not shown) is formed in sample plate 30 for linear encoder 66.

Figure 2:
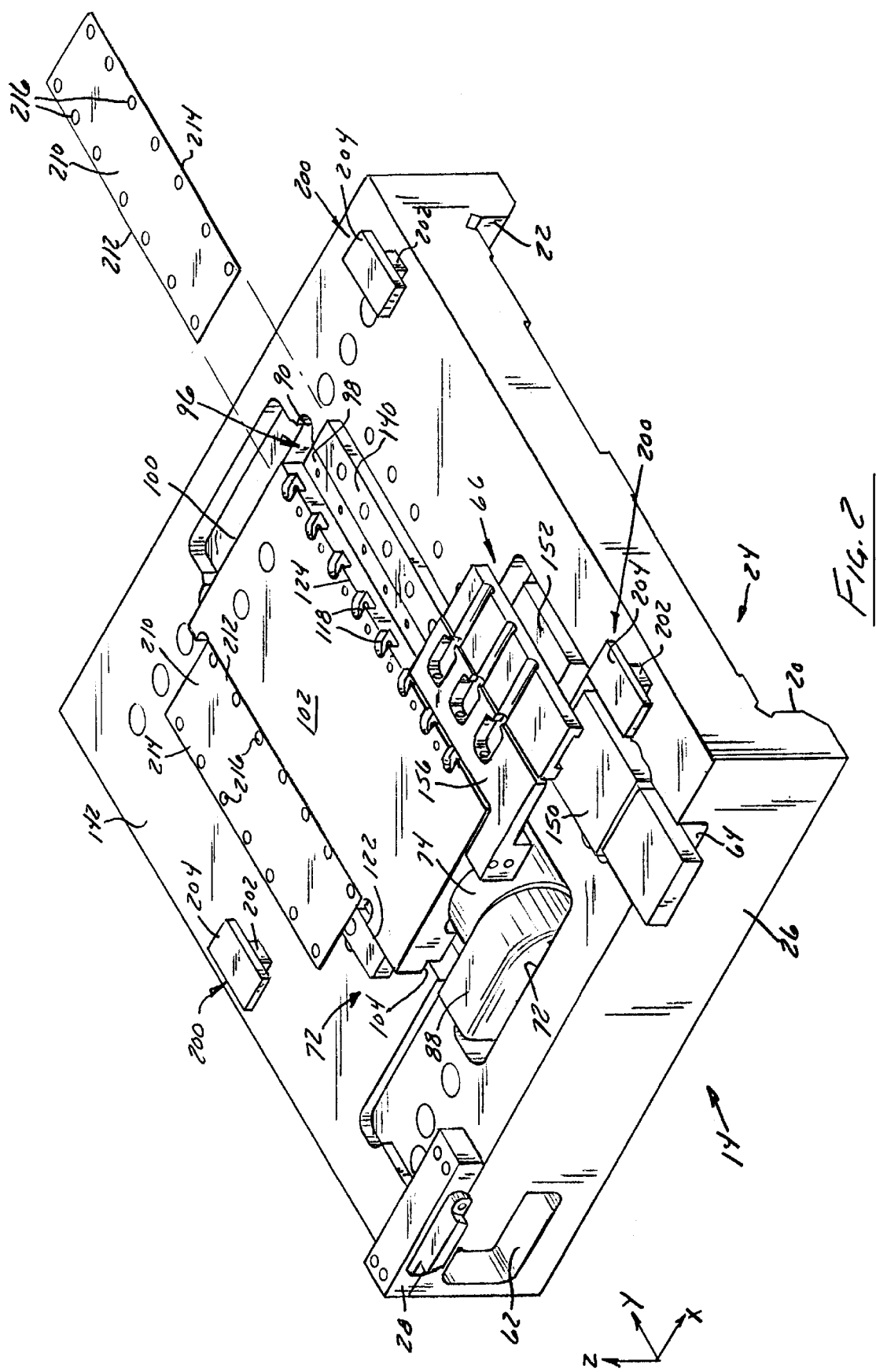
FIG. 2 is a top, perspective view of the precision sample positioning system shown in FIG. 1 with the sample plate assembly removed to view the underlying sample stage positioning mechanism.
Figure 3:
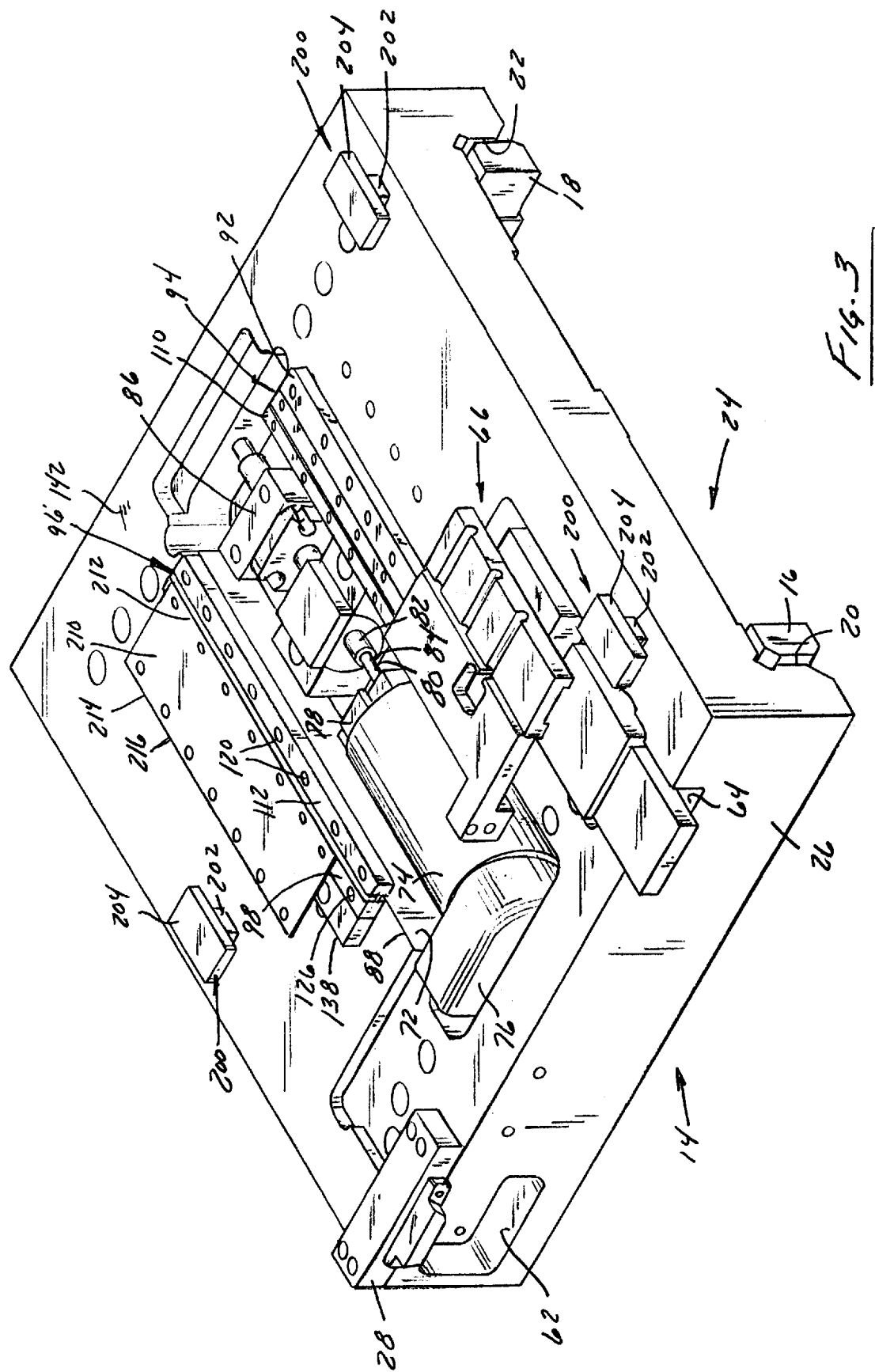
FIG. 3 is a top, perspective view of the precision sample positioning system shown in FIG. 1 with the sample plate and translation plate removed to view the underlying sample stage drive mechanism.
Figure 4:
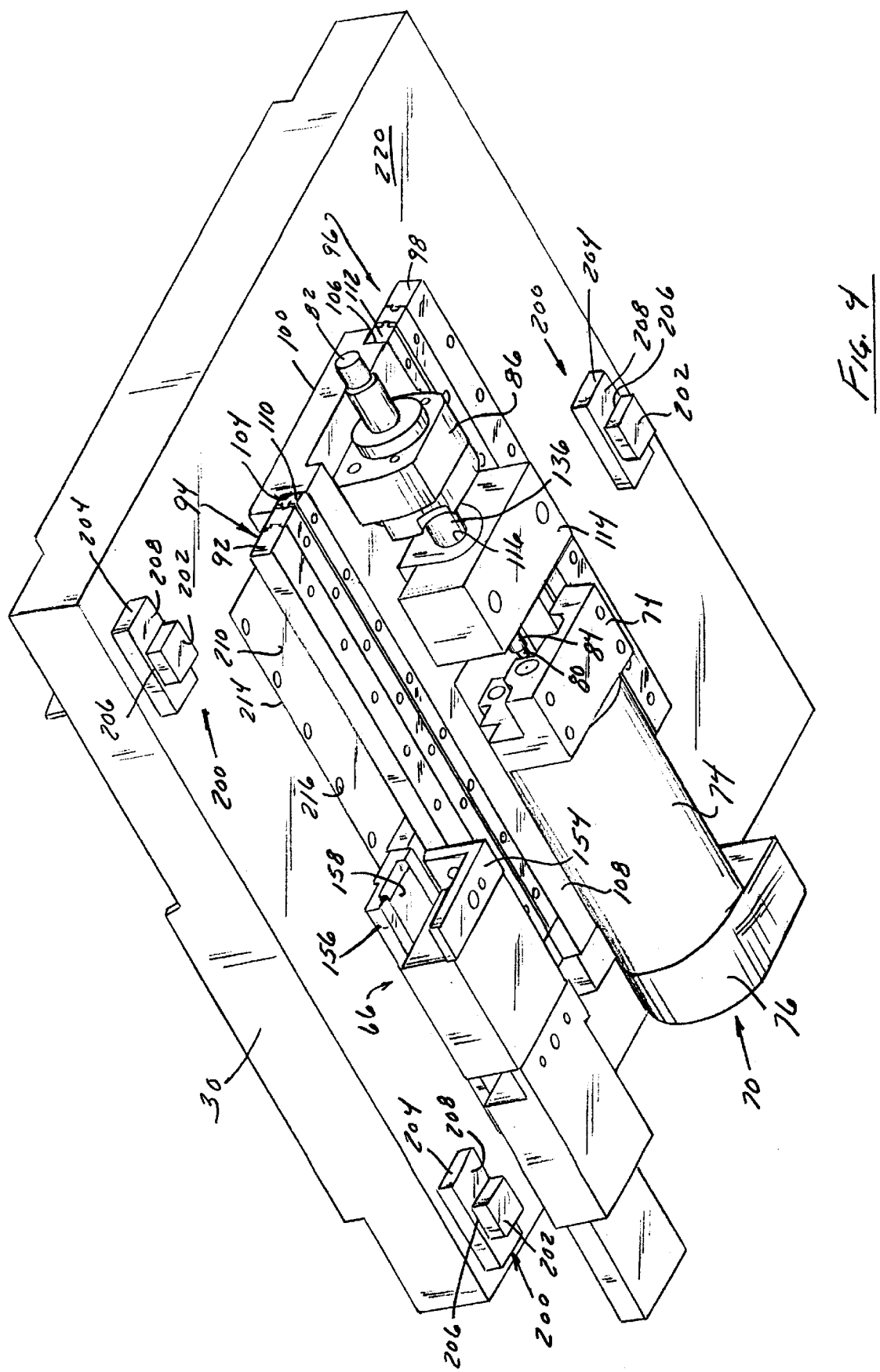
FIG. 4 is a bottom perspective view of the precision sample positioning mechanism shown in FIG. 1 with the base removed to view the sample stage drive mechanism.

Referring now to FIG. 2–FIG. 4, portions of sample stage 12 are removed from precision sample positioning system 10 to reveal the sample stage drive mechanism 70 secured within a drive cavity 72 formed in base 26. More particularly, in FIG. 2 a flexure element 210 is shown in exploded assembly. In FIG. 3 the translation plate 100, the linear bearing assembly 96 and a flexure element 210 are removed, and in FIG. 4 the base 26 is removed. Drive cavity 72 has a generally rectangular shape traversing base 26. Sample stage drive mechanism 70 has a drive axis aligned with a major axis of cavity 72 and includes drive motor 74 with attached rotary encoder 76. Drive motor 74 is arranged to provide a drive force to translation plate 100. More particularly, drive motor 74 is preferably a three phase DC brushless servomotor, such as a Maxon Model No. 18888 motor, with a directly attached rotary encoder, such as an HP Model No. HEDS5500 encoder having a resolution of 4096 counts per revolution. The output shaft 80 of drive motor 74 is coupled to a lead screw 82 using a coupling 84. Lead screw 82 is preferred to be highly accurate in construction with an approximately 0.5 mm pitch and accuracy better than approximately 0.5 micron per centimeter (cm). Drive motor 74 is secured within cavity 72 by drive motor support block 78 secured within cavity 72 by threaded fasteners (not shown). Lead screw 82 is bearing supported within cavity 72 by lead screw support block 86 secured within cavity 72 by threaded fasteners (not shown).

Sample stage drive mechanism 70 further includes translation plate 100, having a generally planar top surface 102, arranged for linear translation relative to base 26. In this regard, secured along a first upper edge 88 of cavity 72 is a fixed portion 92 of a first linear bearing assembly 94 and along a second upper edge 90 of cavity 72 is a fixed portion 98 of a second linear bearing assembly 96 using suitable threaded fasteners (not shown). First linear bearing assembly 94 and second linear bearing assembly 96 are preferably precision linear roller bearings. Translation plate 100 is formed with a first rabbet portion 104 and a second rabbet portion 106 in a bottom surface 108 thereof. A translating portion 110 of first linear bearing assembly 94 is secured within first rabbet portion 104 and a translating portion 112 of second linear bearing assembly 96 is secured within second rabbet portion 106 using suitable threaded fasteners (not shown). More particularly, translation plate 100 is formed with a plurality of apertures 118 disposed on opposite edges 122 and 124 of translation plate 100, respectively. Threaded fasteners are received through apertures 118 and engage threaded apertures 120 formed in translating portion 110 and translating portion 112. Similarly, threaded fasteners are received through apertures formed in base 26 and engage threaded apertures 126 formed in fixed portion 92 and fixed portion 98. During assembly of sample stage drive mechanism 70, bearing positioning block 138 and bearing positioning block 140 are used to ensure precise, accurate positioning of fixed portion 92 and fixed portion 98 to base 26. Bearing positioning block 138 and bearing positioning block 140 are respectively secured to base 26 using threaded fasteners during assembly, and after securing fixed portion 92 and fixed portion 98 to base 26, they are removed. Bearing positioning block 138 and bearing positioning block 140 are shown in various of the views for purposes of illustrating their use in constructing sample stage drive mechanism 70.

A drive block 114 is secured to bottom surface 108 also using threaded fasteners (not shown). Drive block 114 is formed with a threaded through aperture 116 through which a threaded portion 136 of lead screw 82 is received. In this manner, rotation of lead screw 82 causes translation of drive block 114 along a drive axis of lead screw 82, and hence, linear translation of translation plate 100 with respect to base 26. As arranged, the drive force is coupled to translation plate 100 substantially parallel to the drive axis, and likewise, substantially parallel to a top surface 142 of base 26.

Figure 13:
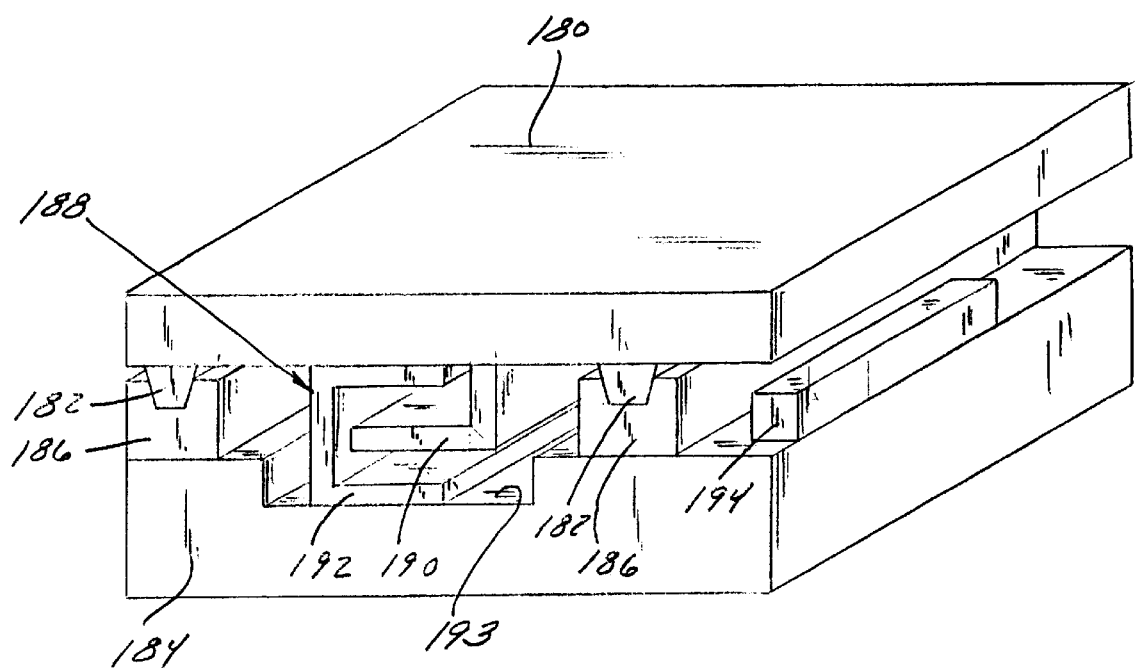
FIG. 13 is a schematic representation view of a precision sample positioning mechanism using a hybrid linear translator.

While the as described preferred embodiment incorporates a drive motor and lead screw arrangement, one of ordinary skill in the art will appreciate that other devices for generating a translation force may be used. For example, it is within the scope of the present invention to use a piezo electric translation device, electromagnetic translation device, such as a linear brushless DC three phase motor, a voicecoil, or a hybrid linear translator. FIG. 13 shows an embodiment in schematic form where previously discussed drive mechanism 70 located within cavity 72 of positioning stage 74 is replaced by a flexureless linear voice coil. FIG. 13 depicts a sample stage 180 having mounted on the underside thereof continuous sliders 182, a positioning stage 184 having mounted on the upperside thereof continuous sliders 186 that are of complementary shape to sample stage sliders 182, and a flexureless linear voice coil 188 having a forcer 190 and magnet array 192 mounted in a cavity 193 in the upperside of the positioning stage 184. The forcer 190 is connected without flexures to the sample stage 180, and the magnet array 192 is connected to the positioning stage 184. Magnet array 192 comprises dual magnet arrays which provide about one cm of travel of the forcer 190. A linear encoder 194, having resolution in the range of 10–100 nm, is also shown schematically to measure motion of the sample stage 180 with respect to the positioning stage 184. It can be seen that the use of a linear motor greatly simplifies system construction by eliminating the need for numerous components of the drive mechanism 70 such as lead screw 82, which can create unacceptable noise on the order of 2–4 nm, as well as flexures 210. The continuous, complementary shaped sliders 182 and 186 also simplify system construction by eliminating the need for first and second linear bearing assemblies 94 and 96, which can contribute unwanted noise to the stage. It should further be appreciated that the present invention is arranged to provide several centimeters of sample translation.

B. Sample Stage Vertical Support and Drive Coupling

With continued reference to FIGS. 2–4, sample stage 12 is supported over base 26 on a plurality of slider assemblies 200. Complete slider assemblies 200 are shown for illustrative purposes in FIGS. 2–3 even though the sample stage 12 is removed from the view. Each slider assembly 200 includes a base slider 202 and a sample stage slider 204. Shown are three slider assemblies 200, but four, five, six or more sliders or two longer continuous runners could also be employed. Base slider 202 and sample stage slider 204 including slide surfaces 206 and 208, respectively, are formed very smooth for providing linear translation with little vertical motion, and are preferably formed from a common material. In a preferred embodiment, the base sliders 202 are approximately 1.0 cm square and 5.7 mm thick because this is a convenient size to process and a large enough size to provide a stiff, stable mechanical system. Preferred sample stage sliders 204 have a generally rectangular shape approximately 2.5 cm long by 1.0 cm wide and 5.7 mm thick. The sample stage sliders 204 are advantageously made larger than base sliders 202 so as to reduce the possibility of dust and/or dirt accumulating on base sliders 202, and hence between base sliders 202 and sample stage sliders 204. In this manner, sample stage 12 is free to slide very smoothly, i.e., with very little vertical motion, on slider assemblies 200 relative to base 26.

With continued reference to FIGS. 2–4, flexure elements 210 couple sample stage drive mechanism 70 to sample stage 12 to achieve highly linear motion without detracting from the smoothness and flatness achieved by slider assemblies 200. In several of the Figures, the linear bearing assemblies 94 and 96 are removed to aid in viewing the flexure elements 210, and in FIG. 2 flexure element 210 is shown elevated away from sample stage drive mechanism 70. Each flexure element 210 has a generally rectangular shape approximately 10 cm long by 3.0 cm wide. A preferred thickness ranges from about 0.4–0.8 mm, and flexure elements 210 are constructed from fully hardened 303 stainless steel. Formed along each longitudinal side 212 and 214 of flexure elements 210, is a plurality of attaching apertures 216. At each side 212, flexure elements 210 are attached to translating plate 100 using threaded fasteners (not shown). At each side 214, flexure elements 210 are attached to a bottom surface 220 of sample plate 30. Thus, the sample stage motion is constrained vertically by slider assemblies 200 and laterally by flexure elements 210, translating plate 100, and linear bearing assemblies 94 and 96. Moreover, driving force is coupled to sample plate 30, longitudinally, from lead screw 82, drive block 114, translating plate 100, and flexure elements 210. This arrangement works without the disadvantages of conventional roller bearing stages, because flexure elements 210 are very stiff laterally, but flexible vertically. Thus, the roller irregularities and drive mechanism vibration are not coupled into vertical motion of sample stage 12. Some coupling exists in the lateral motion, but the repeatability and straightness of motion laterally has been shown to be adequate for profilometry applications. The vertical stiffness of the system comes from the relatively large area of contact of the slider assemblies 200. A preload can be applied vertically to sample stage 12, if desired, to further increase vertical stability. A separate loading mechanism may be used, or more preferably, the loading may be coupled through flexure elements 210.

3. Slider Assembly Construction

Figure 6:
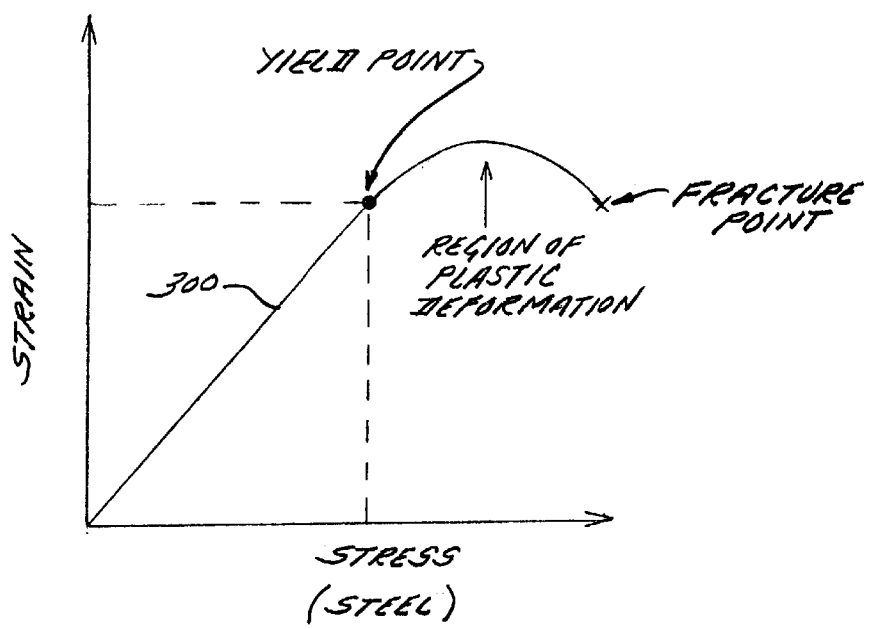
FIG. 6 is a graph illustrating stress/strain characteristics of materials used in prior art bearing constructions.

Selecting an appropriate material for slider assemblies 200 is an important aspect of the present invention. For example, most hard, machinable materials have a stress/strain curve 300 such as shown in FIG. 6, which is typical for a material such as steel. Such materials have a yield point such that when the stress on the material reaches this point the material deforms plastically. Even highly polished surfaces have some surface roughness that causes rubbing when surfaces slide over each other. In addition, Van der Waals inter-atomic forces exist between the top layers of the sliding surfaces. The result of these two effects is that the when two surfaces slide on each other, the surface material in contact is pulled. For materials with a yield point, the pulling causes plastic deformation which results in smearing and spalling on the surfaces. The result is significant sticking and roughening of the surface, which makes the sticking worse as sliding continues. Most hard materials that have been used conventionally in translation mechanisms have such physical characteristics, i.e., a yield point that allows for plastic deformation.

Figure 7:
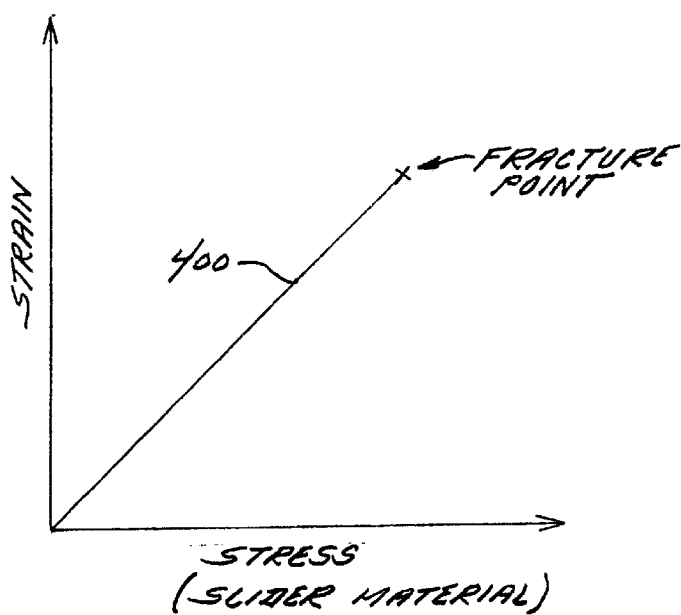
FIG. 7 is a graph illustrating preferred stress/strain characteristics of materials for use in slider constructions in accordance with preferred embodiments of the present invention.

Materials with a stress-strain curve like 400 in FIG. 7 have a fracture point but no yield point. As long as the fracture point is sufficiently high, these surfaces slide easily because no plastic deformation takes place. Basically, the Van der Waals forces and rubbing forces are fracture type forces, so little or no wear occurs, and no smearing occurs before the fracture point. Such surfaces will slide easily and predictably as long as the loading is enough to keep the surfaces in contact, but low enough to avoid Hertzian stress. Examples of such materials include partially stabilized yttrium, toughened zirconia, silicon nitride, boron nitride, various ceramics, and certain other sintered metals. In accordance with the present invention, these materials are applied to form sliders 202 and 204. These materials have in common that they have no yield point, and a fracture point high enough that the sliding forces do not cause asperity breakage. The result is no stiction and no appreciable wear when two surfaces slide over and are in contact with each other, without any intervening lubricant, even under significant load, short of Hertzian stress. Thus, when prepared properly, slider assemblies 200 made of such materials form the basis of extremely high performance positioning systems.

Slider assemblies 200 are preferably constructed and arranged in matched sets, and each slider 202 and slider 204 are lapped to a high degree of flatness, overall less than ten nm. A moderate polish finish works best, as some surface roughness has been observed to produce better sliding. For example, a surface roughness of four nm root-mean-square (RMS) works well. Each slider 202 is attached to surface 142 of base 26 and each slider 204 to bottom surface 220 of sample plate 30. As noted, surface 142 and surface 220 are made of metal such as stainless steel or aluminum and have to be prepared flat to less than four micrometers, and sliders 202 and 204 are attached with an adhesive in such a way as to not distort the flatness.

Preferably a lapping process is used to prepare surfaces 206 and 208 of sliders 202 and 204 and surfaces 142 and 220 of base 26 and sample plate 30. The surfaces 142 and 220 have to be on the order of the sample's size. For example, an integrated circuit wafer, and thus on the order of twenty cm square or more. A conventional approach to preparing the surface 206 and 208 of sliders 202 and 204 is to bond the sliders to surfaces 142 and 220 and lap the sliders 202 and 204 and surfaces 142 and 220 as a unit. This approach requires achieving a high degree of flatness and planarity over a large area. The sliding surfaces for conventional profilometers are lapped using this large area technique. In the present invention, a large area process to lap sliders 202 and 204 may be used. However, a simple and extremely effective technique that does not rely on maintaining such close tolerances over large areas is preferred and explained with reference to FIGS. 8 and 9.

Figure 8:
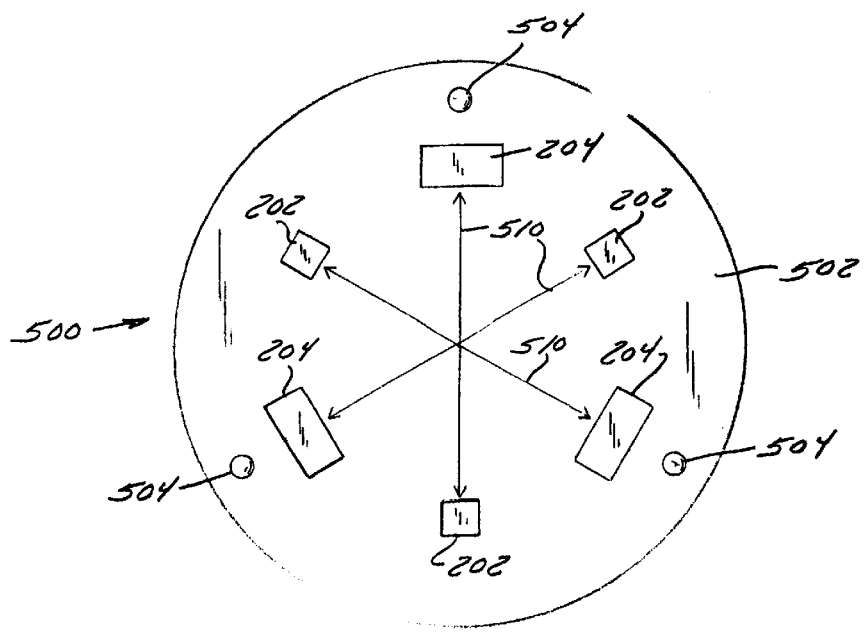
FIG. 8 is a top schematic representation view of an apparatus for forming a slider assembly for use in a precision sample positioning system.
Figure 9:
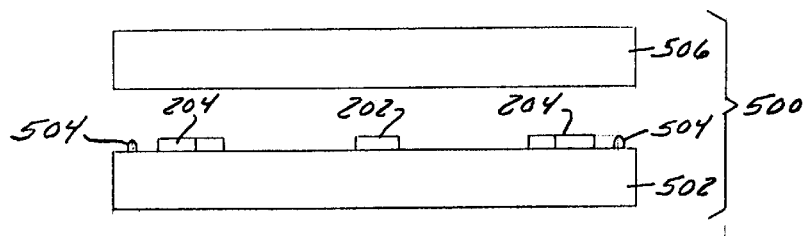
FIG. 9 is a side schematic representation view of the apparatus shown in FIG. 8.

First, the surfaces 142 and 220 are lapped. The intent is to achieve flatness over the local area where sliders 202 and 204 attach, but not necessarily to maintain overall flatness and planarity. Sliders 202 and 204 are prepared on a relatively small lapping fixture 500. As shown in FIGS. 8 and 9, fixture 500 includes a base plate 502 having a typical diameter less than fifteen cm. Three hard diamond stops 504 are placed 120 degrees apart near the edge of base plate 502. Sliders 202 and 204 are placed on base plate 502 in sets of two 510 such that sliders 202 and 204 are each set on opposite sides of base plate 502. When the lapping plate 506 (FIG. 9) is brought into contact with diamond stops 504, any small tilt between lapping plate 506 and one of the sliders of a set 510 will be applied in the opposite direction to the other slider in set 510. When the sliders are turned over to lap the other side, they must be placed in the same arrangement. Thus, processing sliders 202 and 204 in sets 510 assures the sliding surfaces are almost perfectly parallel.

When sliders 202 and 204 are mounted to lapped surfaces 142 and 220 on base 26 and sample plate 30, respectively, they are clamped firmly in place. A bead of high sheer strength cyanoacrylate adhesive is applied around the edge of the slider. The adhesive wicks between the slider and the surface along the lap marks, and pulls the slider to the surface uniformly together as it sets. Thus, the small area of the lapping fixture 500 assures uniform flatness, the slider sets arranged relative to the three diamond stops assures parallelism, and the wicking action of the adhesive assures no distortion due to the bonding. The result is a relatively simple, reliable surface preparation process that produces superior sliding performance. Additional handlapping of the mounted sliders may be performed as necessary to achieve acceptable flatness, once positioning stage 14 is mounted on the support structure.

Sliders 202 and 204 have been described in terms of prismatic shapes, which can be conveniently made from the preferred materials. Shapes other than prismatic structures may be employed without departing from the scope of the present invention. For example, a slightly radiused surface may be employed for one or both of surfaces 206 and 208, or negative pressure contours may be used. Additionally, while several preferred materials have been disclosed, additional materials meeting the property criteria disclosed may also be used.

4. Controller

In addition to rotary encoder 76 secured to drive motor 74, sample stage drive mechanism 70 also includes linear encoder 66. Linear encoder 66 is preferably a non-contact optical encoder with a four micro inch (0.1 micron) resolution. A suitable linear encoder 66 is the RSF Model No. MSA-6705 encoder. Linear encoder 66 includes first encoding unit 150 and second encoding unit 152 secured via an encoder bracket 154 to base 26. Secured via bracket 156 to translation plate 100 is a glass scale 158. It will be appreciated that alternate encoding technologies may be used, such as lasers and the like.

Linear encoder 66 and rotary encoder 76 are used in conjunction to ensure very precise position control, but even more importantly, very precise velocity control. A potential large source of vertical noise in a profilometer output signal could result from imprecise translational velocity control, or jitter. Jitter noise has been observed to be on the order of 2.5–3.0 nm. As noted above, the rotary encoder preferably has a resolution of 4096. The linear encoder can be interpolated to 10 nm resolution. However, currently the linear encoder has a 4 micro inch (0.1 $\mu$m) resolution, or 1 count every 4 micro inches (0.1 $\mu$m). Thus, there are about 5 counts of the rotary encoder per 1 count in the linear encoder. This allows for very precise velocity control.

5. Alternate Slider Arrangements

Figure 10:
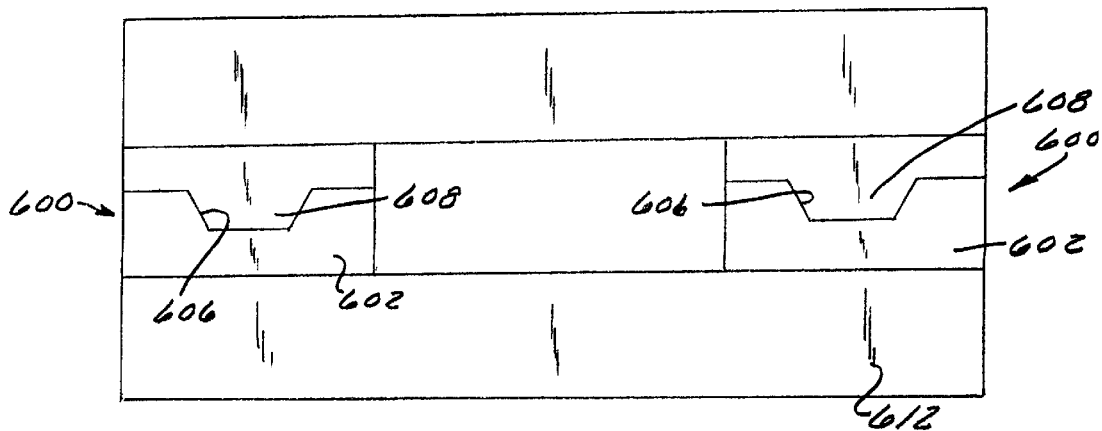
FIG. 10 is a side schematic representation a sample stage in accordance with an alternate preferred embodiment of the present invention.

Although the performance of the described preferred embodiment is extraordinary, a simpler device could be made when still more complex shapes are formed in the slider material. In the embodiment shown in FIG. 10, the slider assemblies 600 are formed into a shape such that when attached to sample plate 30 and base 26, the motion is constrained in a straight line without external constraints, i.e., linear bearing assemblies. As shown, base slider 602 includes a linear channel portion 606 while sample stage slider 604 is formed with a corresponding linear protrusion 608. Linear channel portion 606 is engaged by linear protrusion 608 to constrain translation in a straight line. Linear channel portion 606 and linear protrusion are shown to have a generally rectangular shape with tapered side walls thereof. It will be appreciated that other shapes, such as corresponding arcuate channels, may be used.

It should be pointed out that an advantage to the invention is that there is no inherently preferred sliding direction, which is the reason a lateral constraining method is required in the above embodiments. It would be possible, with proper control of the driving actuators to operate an unconstrained slider utilizing opposing flat sliders and push the stage in two dimensions, without the necessity of stacking two one-dimensional stages at right angles. The directional control could be achieved with positional feedback and appropriate drivers. For example, if hybrid voice coil drivers were used, x, y, and even rotational motion could be achieved with a single slider arrangement.

Figure 14:
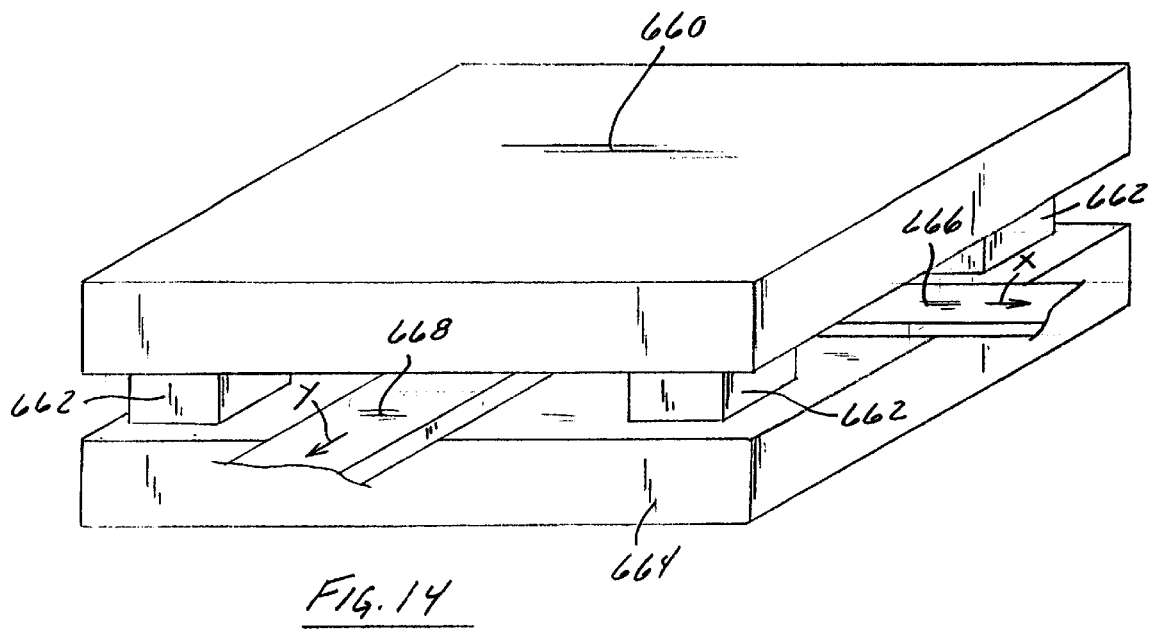
FIGS. 14 and 15 are schematic representation views of an alternative slider arrangement.
Figure 15:
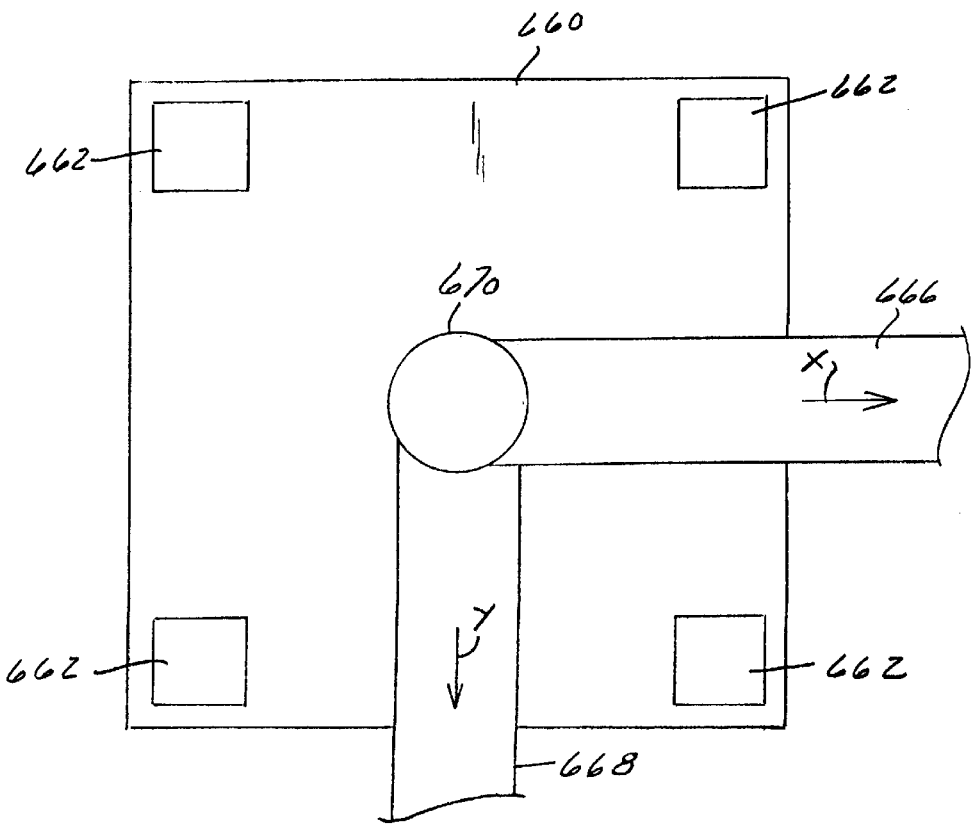

Referring to FIGS. 14 and 15, an alternative slider arrangement is depicted which includes sample stage 660 having mounted on the underside thereof four ceramic sliders 662. Sliders 662 slide on a large block 664 of similar material. Sample stage 660 is moved via x and y driver arms 666 and 668 respectively which are connected to the underside of sample stage 660 at connection 670 and driven by a controller (not shown).

Besides profilometry, other applications of the novel translation mechanism are potentially important. For example, wafer stepper aligners currently rely on air bearing stages. Because of the air gap, when the air bearing stage returns to specific x-y coordinates, the stage can be slightly tilted compared to the previous trip to those coordinates. This slight tilting or cocking of the stage can be difficult to detect with the position sensing interferometers commonly used in stepper stages. Effectively this limits the positioning repeatability of stepper stages to about 0.1 microns. Stepper positioning repeatability effectively limits the registration accuracy between layers for multi-level integrated circuits. With decreasing feature size of integrated circuit components, positioning repeatability will have to improve to much better than the current 0.1 micrometers. The present invention does not have this tilting limitation since the slider assemblies are in firm, repeatable contact, and are capable of much better repeatability. Thus, the present invention can provide improved positioning repeatability.

6. Applications

Figure 12:
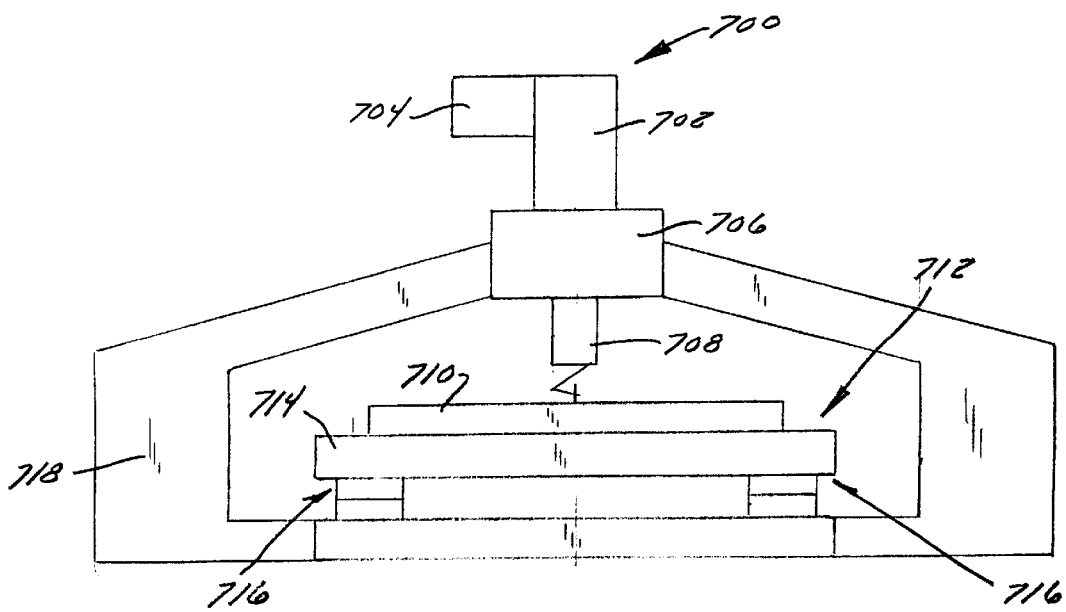
FIG. 12 is a side schematic representation view of a measuring apparatus in accordance with a preferred embodiment of the present invention.

One of the most useful applications of the invention is to combine it with an AFM. As shown in FIG. 12, a typical AFM 700 includes a laser source 702, a deflection detector 704, a three-axis piezo scanner 706 and a cantilever probe 708, suspended over a sample 710 mounted to a general schematic representation of a precision positioning system 712 constructed in accordance with the present invention. More particularly, the precision positioning system includes sample plate 714, sliders 716, and fixed structure 718. AFM scanners are typically limited to a hundred microns or less and are capable of taking topography data in the form of single line scans up to full two-dimensional images on the scale of a few nanometers up to about one micron. In this size range, AFMs provide the highest resolution with the least impact on the sample surface of any profiling device.

Profilometers have lateral resolution and are used on typical integrated circuit. However, these devices often leave significant scratches. The AFM limitation has been that even though it is superior for high-resolution data, it had been incapable of acquiring height data over lateral distances of more than several microns. There are, however, many measurements of interest in high technology industry that need to be done over length scales of millimeters or centimeters. The flatness of a positioning system in accordance with the present invention combined with an AFM allows for high-resolution AFM scanning with the stage stationary. Disengaging the AFM lateral scanning, and just using the vertical part of the AFM, while translating the sample allows for faster, higher resolution, less damaging profiling than can be achieved with any existing profilometer. This combination device is an extremely powerful tool for high technology industries.

Another application of the present invention lies in electron-beam or ion-beam tools, such as direct writing lithography systems or ion mills. These devices must operate either by scanning the beam over the work piece or by translating the work under a fixed beam. The depth of field of beam based systems is very small and current translation mechanisms are not flat enough to keep the beam in focus over useful lateral distances. Thus, the beam is typically scanned or steered over the sample. Beam steering optics are complex, expensive, and produce aberrations. The present invention with its high degree of flatness makes it possible for sample translation holding the beam fixed, resulting in higher performance systems. Precision machine tools, such as exotic optics grinder/polishers for X-ray optics or diamond turning machines, can also benefit from the invention. The present invention makes possible a whole range of applications where the process or measurement device can remain in one fixed orientation while the sample or work piece is moved, as opposed to the current technology where the positioning system is used to position the sample at a given coordinate location between process or measurement steps, but is stationary during actual process or measurement.

Figure 5:
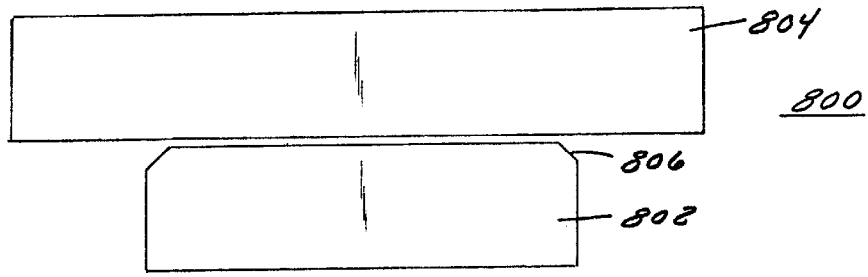
FIG. 5 is a side schematic representation view of a slider for use in a precision sample positioning system.

Although a superior profilometry stage can be achieved with the invention, a dual mode system is possible as well. The sliders may be fabricated such that they can be separated by air for fast sample positioning, and then operate in contact sliding mode for high performance process or measurement operation. For example and referring to FIG. 5, a slider assembly 800 is shown and includes a base slider 802 and a sample stage slider 804 in sliding engagement. Base slider 802 is formed with a negative pressure contour 806, which with sufficient translation velocity, generates lift and separation of base slider 802 and sample stage slider 804. Traditional air bearing stages may also be used to generate lift, thereby forming a hybrid combined hydrostatic or hydrodynamic air bearing stage and sliding stage.

Figure 11:
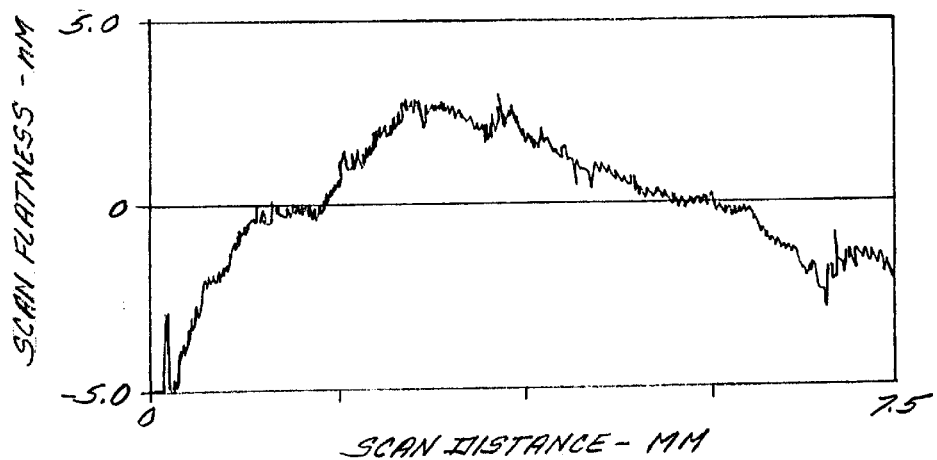
FIG. 11 is a chart illustrating vertical performance stability of precision sample positioning systems constructed in accordance with preferred embodiments of the present invention.

A precision sample positioning system constructed in accordance with the present invention and design for travel of up to 1 cm can be optimized for semiconductor profilometry applications. Expected scan flatness is on the order of less than 2 nm over 5 mm, at scan speeds in excess of 1 mm/sec. Measured scan flatness of an experimental apparatus, shown in FIG. 11, is on the order of 7 nm over 7.5 mm scans. This performance significantly exceeds the performance of existing profilometer sample stages. By using longer sliders or runners, the concept of the present invention can be extended to larger travel lengths, such that both coarse sample positioning and high-resolution profilometry could be done with the same translation element.

Many other changes and modifications could be made to the invention without departing from the fair scope and spirit thereof. The scope of some changes is discussed above. The scope of others will become apparent from the appended claims.

I claim:

1. A sample stage comprising:
    a base plate including a planar support surface;
    a plurality of support sliders secured to said planar support surface, each of said plurality of support sliders having a substantially planar sliding surface arranged substantially parallel to said planar support surface;
    a sample plate arranged for translation relative to said base plate, said sample plate including a plurality of sample plate sliders secured to said sample plate and arranged for sliding engagement with said plurality of support sliders; and
    wherein each of said plurality of support sliders and each of said plurality of sample plate sliders are formed from a common material.

2. The sample stage of claim 1, wherein said common material comprises a material that fractures prior to yielding.

3. The sample stage of claim 1, wherein said common material comprises a ceramic material.

4. The sample stage of claim 1, wherein said common material comprises a material selected from the group of materials consisting of partially stabilized yttrium zirconia, silicon nitride, and boron nitride.

5. The sample stage of claim 3, wherein said common material comprises partially stabilized yttrium zirconia.

6. The sample stage of claim 1, further comprising a sample stage driver secured to said planar support surface and coupled to a translation stage, said sample stage driver arranged to deliver a translation force to said translation stage, said translation force being oriented substantially parallel to said planar support surface;
    said translation stage supported on said planar support surface for translating relative to said planar support surface responsive to said translation force; and
    at least one flexible coupling member secured to said translation stage and to said slider stage, said at least one flexible support member arranged to couple said translation force "in-plane" to said slider stage.

7. The sample stage of claim 6, wherein said at least one flexible coupling member comprises a flexure, said flexure coupled to said translation stage and to said sample plate.

8. The sample stage of claim 7, wherein said flexure comprises a plate member having a rectangular shape and a thickness.

9. The sample stage of claim 6, further comprising an encoder.

10. The sample stage of claim 9, wherein said encoder comprises a linear encoder coupled to said sample stage and to said planar support surface.

11. The sample stage of claim 6, wherein said sample stage driver comprises a drive block secured to said translation stage, a drive screw received in a threaded aperture formed in said drive block and a drive motor arranged to rotate said drive screw.

12. The sample stage of claim 11, further comprising an encoder, wherein said encoder comprises a rotary encoder coupled to said drive motor.

13. The sample stage of claim 12, wherein said encoder further comprises a linear encoder coupled to said sample stage and said support.

14. The sample stage of claim 13, wherein said rotary encoder provides a rotary encoder count and said linear encoder provides a linear encoder count, said rotary encoder count being greater than said linear encoder count.

15. The sample stage of claim 14, wherein said rotary encoder count exceeds said linear encoder count on the order of 5 to 1.

16. The sample stage of claim 11, further comprising a controller arranged to provide control signals to said drive motor responsive to at least one of an input command and an encoder signal.

17. The sample stage of claim 6 wherein said sample stage driver comprises a linear motor.

18. The sample stage of claim 17 wherein said linear motor comprises one of a linear brushless DC three phase motor, a hybrid linear translator, and a flexureless linear voice coil.

19. The sample stage of claim 1, wherein each of said plurality of support sliders has a support sliding surface area and wherein each of said plurality of sample plate sliders has a sample plate sliding surface area, and wherein said sample plate sliding surface area is greater than said support sliding surface area.

20. The sample stage of claim 19, wherein each of said plurality of support sliders includes a beveled edge about a periphery of said sliding surface.

21. The sample stage of claim 1, wherein at least one of the support sliders and the sample plate sliders is formed with a negative pressure contour.

22. The sample stage of claim 1, wherein said plurality of support sliders is adhesively bonded to said planar support surface and said plurality of sample plate sliders is adhesively bonded to said sample plate.

23. The sample stage of claim 22, wherein said plurality of support sliders is in the form of one large block and said plurality of sample plate sliders slides on said large block.

24. The sample stage of claim 1, wherein at least one of said plurality of support sliders is formed with a linear guide structure, and wherein a corresponding sample plate slider is formed with a complementary linear guide structure, said linear guide structure and said complementary linear guide structure cooperating for directing said sample plate in a linear translation path.

25. The sample stage of claim 24, wherein said linear guide structure comprises a linear recess, and said complementary linear guide structure comprises a complementary linear protrusion.

26. The sample stage of claim 1, further comprising a two axis drive mechanism arranged to translate said sample plate in two dimensional sliding motion with respect to said base plate.

27. A slider for use in a slider stage, said slider stage comprising a base plate and a sample plate, said sample plate being supported for translational movement relative to said base plate via a plurality of sliders, each of said plurality of sliders comprising:

a base slider member having a prismatic shape, a planar sliding surface, and a planar mounting surface;

a sample plate slider member having a prismatic shape, a planar sliding surface, and a planar mounting surface; and wherein said base slider member and said sample plate slider member are formed from a common material, and wherein said base slider member is in direct mechanical contact with said sample plate slider member.

28. The slider of claim 27, wherein said common material comprises a material that fractures prior to yielding.

29. The slider of claim 27, wherein said common material comprises a ceramic material.

30. The slider of claim 27, wherein said common material comprises a material selected from the group of materials consisting of partially stabilized yttrium zirconia, silicon nitride, and boron nitride.

31. The slider of claim 29, wherein said common material comprises partially stabilized yttrium zirconia.

32. The slider of claim 27, wherein each said base slider member has a support sliding surface area, and wherein each said sample plate slider member has a stage sliding surface area, and wherein said stage sliding surface area is greater than said support sliding surface area.

33. A slider for use in a slider stage, said slider stage comprising a base plate and a sample plate, said sample plate being supported for translational movement relative to said base plate via a plurality of sliders, each of said plurality of sliders comprising:

a base slider member having a prismatic shape, a planar sliding surface, and a planar mounting surface;

a sample plate slider member having a prismatic shape, a planar sliding surface, and a planar mounting surface;

wherein said base slider member and said sample plate slider member are formed from a common material, and wherein each said base slider member has a support sliding surface area, and wherein each said sample plate slider member has a stage sliding surface area, and wherein said stage sliding surface area is greater than said support sliding surface area, and wherein each of said plurality of sliders comprise a beveled edge about a periphery of said sliding surface.

34. The slider of claim 27, wherein said base slider member is arranged for adhesive bonding to said base plate.

35. The slider of claim 27, wherein said sample plate slider member is arranged for adhesive bonding to said sample plate.

* * * * *